United States Patent Office 3,193,346
Patented July 6, 1965

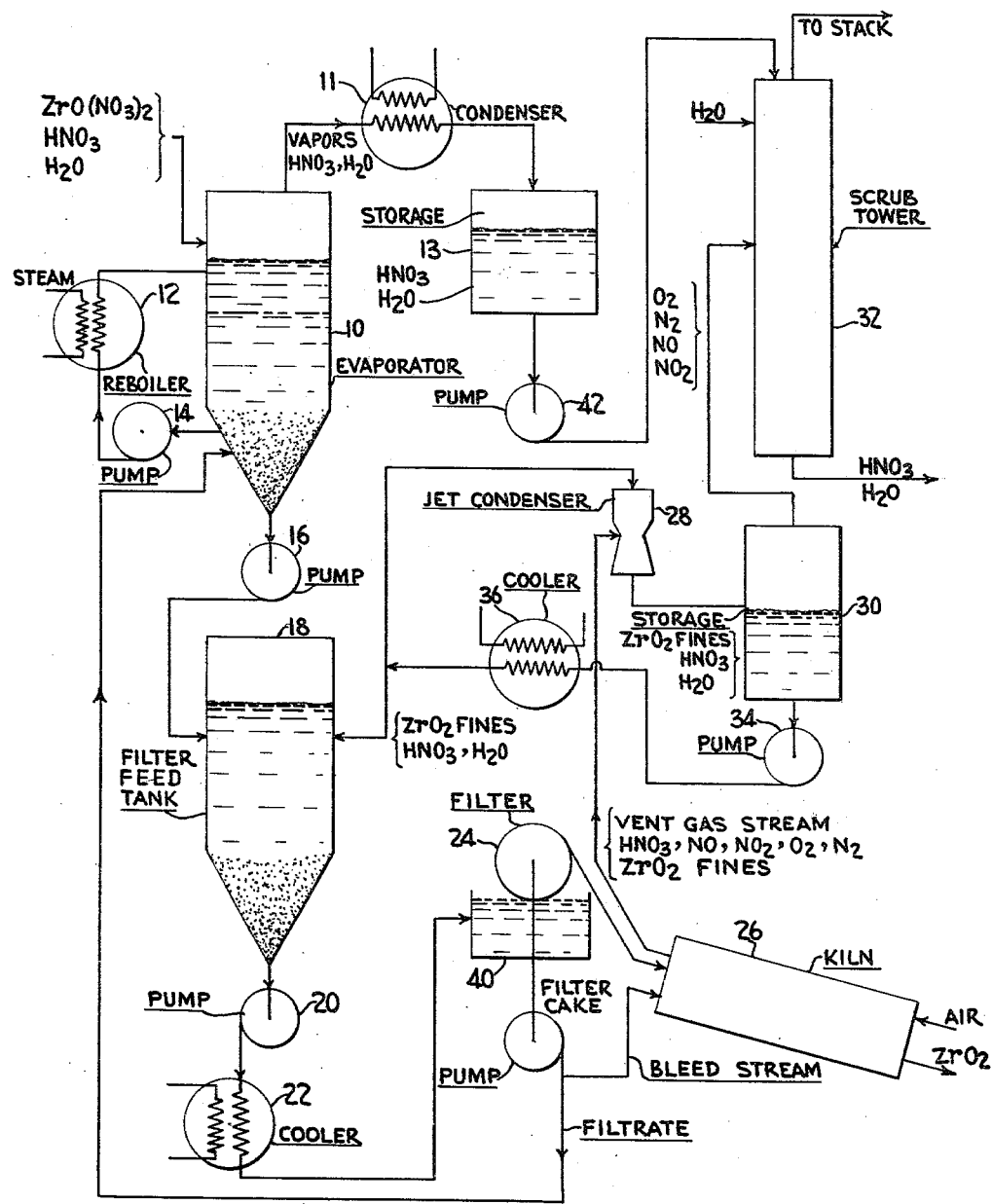

3,193,346
PROCESS FOR PREPARING ZIRCONIUM OXIDES
Irvin C. Klimaszewski, Pensacola, Fla., assignor, by mesne assignments, to Pittsburgh Plate Glass Company
Filed Mar. 6, 1962, Ser. No. 177,890
3 Claims. (Cl. 23—140)

This application is a continuation-in-part of my copending application, Serial No. 819,093, filed June 9, 1959, now abandoned.

This invention relates to the production of chemicals and more particularly to the production of zirconium dioxide from a zirconyl nitrate solution. The principal object of the present invention is to provide an improved process for the production of zirconium dioxide with high efficiency and excellent recovery of by-product nitric acid.

Still another object of the invention is to provide a process of the above type wherein maximum productivity can be obtained from the process equipment with a minimum loss of zirconium values.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description taken in connection with the accompanying drawing which is a schematic flow sheet.

The process of the present invention will be particularly described in connection with its use as a part of an overall process for the production of high purity zirconium particularly adapted to nuclear reactor use. In the purification of zirconium for reactor use, it is essential that substantially all hafnium be removed therefrom. One process for achieving such separation embodies a solvent extraction of zirconyl nitrate with an organic solvent such as tributyl phosphate. In such a process, the purified zirconyl nitrate is then removed from the organic phase by washing with an aqueous acid solution.

The resultant aqueous acid solution is then concentrated to precipitate zirconyl nitrate crystals. The slurry of crystals is transferred to a filter feed tank from which it is fed to a filter where the zirconyl nitrate crystals are separated from the mother liquor. The mother liquor is recycled to the evaporator and the filter cake containing the basic zirconium nitrate or nitrate of higher zirconium content (zirconyl nitrate) crystals is fed to a calcining kiln wherein the zirconyl nitrate is decomposed to zirconium dioxide and oxides of nitrogen.

The calcining operation inevitably generates some fine zirconium dioxide dust which leaves the kiln in the vent stream of air and oxides of nitrogen. Since these zirconium dioxide fines contain valuable highly purified zirconium, they are recovered by scrubbing in a jet condenser. The thus recovered fines are fed back to the filter feed tank containing the zirconyl nitrate slurry.

In a preferred embodiment of the invention, the concentration of the zirconyl nitrate solution is achieved in an evaporator having an associated steam-heated reboiler. Since the above described process also involves a high degree of recycle between the evaporator tank and the effluent from the jet condenser, it is desired that a small bleed stream be sent forward into the kiln to prevent the undue accumulation of impurities in the filtration recycle system.

Referring now to the drawing, there is illustrated one preferred embodiment of process equipment for practicing the present invention. As illustrated, the aqueous solution of nitric acid and zirconyl nitrate is introduced into an evaporator 10 wherein the solution is concentrated by boiling off vapors of nitric acid and water. These vapors are condensed in a condenser 11 and the resultant liquid is then fed to a storage tank 13. The solution in the evaporator 10 is continuously recycled by means of a large pump 14 through a reboiler 12 where an elevated temperature is maintained by means of the steam coil. The zirconyl nitrate crystals which collect on the bottom of the evaporator 10 are transferred from the evaporator 10 to a filter feed tank 18 by means of a suitable transfer pump 16. From the feed tank 18 the zirconyl nitrate crystal slurry is transferred by means of a pump 20 through a cooler 22 to a drum filter 24. The basic nitrates of zirconium (zirconyl nitrate or nitrates of a higher zirconium content than zirconyl nitrate) as a filter cake is fed from the filter 24 to a kiln 26 where it is heated to a sufficiently elevated temperature to decompose the nitrate to zirconium dioxide and oxides of nitrogen. Air is preferably passed through the kiln so that the vent gases leaving the kiln contain water, nitric acid, oxygen, oxides of nitrogen and nitrogen. These gases are quenched in a jet condenser 28 wherein some of the oxides of nitrogen are converted to nitric acid and all of the zirconium dioxide fines in the gas stream from the kiln are scrubbed out of the gas stream and are collected in a storage tank 30 where the effluent liquid from the jet condenser is separated from the residual gases. These residual gases then pass through a scrub tower 32 where most of the oxides of nitrogen are recovered as nitric acid. The jet condenser effluent storage tank 30 will contain nitric acid, water and some valuable zirconium dioxide fines. Accordingly, a portion of this liquid is recycled, by means of pump 34, through a cooler 36 back to the filter feed tank 18. Another portion of the liquid is fed to the jet condenser 28 to serve as the working liquid in the jet condenser.

In a preferred embodiment, a portion of the mother liquor from the filter 24 is pumped by means of pump 40 in a small bleed stream to the calcining kiln 26. The major portion of the mother liquor is returned to the evaporator 10.

As indicated in the drawing, the mixture of nitric acid and water, which is distilled from the zirconyl nitrate solution in the evaporator tank, is condensed and stored in the storage tank 13. In a preferred embodiment of the invention this liquid is used as a scrub liquid along with some additional water in the scrub tower 32 to remove the residual oxides of nitrogen from the kiln vent gases.

It should be apparent, from the above consideration of the process, that there is excellent economy of zirconium values and substantially complete recovery of the nitrogen content in the zirconyl nitrate solution feed to the evaporator 10. Thus, the recovered nitric acid can be utilized in a preceding step in the process for the formation of the zirconyl nitrate feed for the extraction system.

*Example 1*

In one preferred method of operating the above-described apparatus, the feed stream to the evaporator contains about .25–.55 pounds zirconium/gal. and about 18–24% $HNO_3$. The evaporator is run at about 240°–255° F., so that the vapor stream going to condenser 11 contains about 18–25% $HNO_3$.

The feed to the evaporator is 6 g.p.m. and there is about an 8-hour residence time for the liquid in the evaporator. About 3 g.p.m. leaves the evaporator as vapor and about 3 g.p.m. leaves as concentrated slurry. In one preferred embodiment, the circulating pump 14 between the evaporator 10 and reboiler 12 is a very high capacity pump of about 1100 g.p.m. With the 3 g.p.m. feed of slurry to the filter feed tank, about 0.3 g.p.m. of mother liquor is fed forward in the bleed stream from the filtrate stream to the kiln 26. The outside temperature of the kiln varies between about 1100° F. and 1500° F., the higher temperature being present at the discharge end. The temperature of the gas stream leaving the kiln 26 is 560° F.

While one preferred embodiment of the invention has been described above, numerous modifications thereof can be made without departing from the scope of the invention. For example, the residence time of the zirconyl nitrate in the evaporator may be varied widely from the eight (8) hours mentioned. If a dense zirconium oxide product is desired, the residence can be increased to 10 to 30 hours or more, as described in my copending application, Serial No. 819,839, filed June 12, 1959.

Equally, the temperature and the pressure of the slurry in the evaporator can be varied substantially, as can the flow rates to and from the evaporator. Similarly, the method of heating the slurry, the temperature of the calcination step and the feed rates to the filter are not critical. In fact, centrifugal separation of the crystals can be employed in lieu of filtration.

Although the present invention has been described with reference to the specific details of certain embodiments, it is not intended that such details shall be regarded as limitations upon the scope of the invention except insofar as included in the accompanying claims.

I claim:

1. In the process of preparing zirconium oxide from a solution of zirconyl nitrate and nitric acid wherein the solution is concentrated in an evaporator to precipitate some solid zirconyl nitrate with subsequent filtration of the solid zirconyl nitrate and calcination of the solid zirconyl nitrate to zirconium oxide the improvement which comprises recovery finely-powdered zirconium oxide resulting from the calcining step and recycling said finely-powdered zirconium oxide so recovered to the filtration step.

2. The process of preparing zirconium oxide from a solution of zirconyl nitrate and nitric acid which comprises the steps of concentrating the solution in an evaporator to precipitate some of the zirconyl nitrate, transferring a portion of the resultant slurry to a separation step to remove solid zirconyl nitrate and form a mother liquor, recycling the mother liquor from the separation step to the evaporator, calcining the solid zirconyl nitrate so removed to zirconium oxide, recycling to the separation step finely-powdered zirconium recovered from the calcining step and feeding a portion of the mother liquor recycle stream formed in the separation step to the calcining step.

3. The process of preparing zirconium oxide from a solution of zirconyl nitrate in nitric acid which comprises the steps of maintaining a body of the solution in an evaporator at an elevated temperature to boil off nitric acid and water to concentrate the solution and thereby to precipitate some of the zirconyl nitrate, withdrawing a slurry of solid zirconyl nitrate from the evaporator, separating the solid zirconyl nitrate, calcining the solid zirconyl nitrate to zirconium oxide, recovering and recycling finely-powdered zirconium oxide produced in the calcining step to the separation step, and feeding fresh solution of zirconyl nitrate to the evaporator at a rate sufficient to compensate for vapors and slurry removed from the evaporator.

References Cited by the Examiner
UNITED STATES PATENTS

| 2,285,443 | 6/42 | Kinzie et al. | 23—24.1 |
| 2,579,107 | 12/51 | Bertolus | 23—17 |
| 3,090,670 | 5/63 | Stambough et al. | 23—140 |

OTHER REFERENCES

Blumenthal: "The Chemical Behavior of Zirconium," D. Van Nostrand Co., Inc., New York, 1958, pages 285–286.

Mellor: "Comprehensive Treatise on Inorganic and Theoretical Chemistry," vol. 7, Longmans, Green & Co., New York, 1927, pages 124, 161, 162.

MAURICE A. BRINDISI, *Primary Examiner.*